(12) United States Patent
Asaoka

(10) Patent No.: US 8,177,683 B2
(45) Date of Patent: May 15, 2012

(54) CONTINUOUSLY VARIABLE TRANSMISSION AND STRADDLE-TYPE VEHICLE

(75) Inventor: Ryousuke Asaoka, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1084 days.

(21) Appl. No.: 12/057,275

(22) Filed: Mar. 27, 2008

(65) Prior Publication Data

US 2008/0242500 A1    Oct. 2, 2008

(30) Foreign Application Priority Data

Mar. 30, 2007  (JP) ................ 2007-090683
Sep. 6, 2007   (JP) ................ 2007-231760

(51) Int. Cl.
*F16H 59/20* (2006.01)
*F16H 61/662* (2006.01)
(52) U.S. Cl. .................. 477/44; 477/136
(58) Field of Classification Search .......... 477/42, 477/43, 44, 46, 115, 120, 133, 136, 141; 474/8–29
See application file for complete search history.

(56) References Cited

U.S. PATENT DOCUMENTS

| | | | |
|---|---|---|---|
| 5,514,046 A * | 5/1996 | Petersmann et al. | 477/39 |
| 8,047,960 B2 * | 11/2011 | Asaoka | 477/43 |
| 2002/0028727 A1 * | 3/2002 | Iida et al. | 477/125 |
| 2004/0097328 A1 * | 5/2004 | Makiyama et al. | 477/43 |
| 2008/0194380 A1 * | 8/2008 | Unno | 477/44 |
| 2008/0287256 A1 * | 11/2008 | Unno | 477/115 |
| 2009/0143192 A1 * | 6/2009 | Fuchs et al. | 477/43 |

FOREIGN PATENT DOCUMENTS

| | | |
|---|---|---|
| JP | 62-175228 | 7/1987 |
| JP | 04-131558 | 5/1992 |
| JP | 04-210156 | 7/1992 |
| WO | WO 2006/006506 A1 | 1/2006 |

* cited by examiner

*Primary Examiner* — Michael Mansen
*Assistant Examiner* — Robert Reese
(74) *Attorney, Agent, or Firm* — Rabin & Berdo, PC

(57) ABSTRACT

When performing kick down, during re-acceleration after decelerating, the engine sometimes races unnecessarily, and a smooth acceleration feeling is not obtained. During control by a kick down mode, when accelerating after a throttle has been fully closed, a control target value is set so as not to pass to a Low side of a limit value of the control target value used during re-acceleration. As a result, racing of the engine is inhibited.

24 Claims, 10 Drawing Sheets

CONTINUOUSLY VARIABLE TRANSMISSION AND STRADDLE-TYPE VEHICLE

RELATED APPLICATIONS

This application claims the benefit of priority under 35 USC 119 of Japanese patent application no. 2007-090683, filed on Mar. 30, 2007, and Japanese patent application no. 2007-231760, filed on Sep. 6, 2007, which applications are hereby incorporated by reference in their entireties.

BACKGROUND OF THE INVENTION

1. Field of the Invention

The present invention relates to a continuously variable transmission (CVT), and more particularly to a CVT that is suitable for mounting in a vehicle such as a straddle-type vehicle.

2. Description of Related Art

A V-belt type CVT is often used in a straddle-type vehicle such as a scooter motorcycle. A V-belt type CVT includes a primary shaft to which output of a power source such as an engine is input, a secondary shaft that extracts output to be transmitted to a driving wheel, and paired primary and secondary sheaves that are respectively disposed on the primary and secondary shafts, and that have variable groove widths. A V-belt is wound around both sheaves, and a groove width adjustment mechanism varies the groove width of each sheave. As a result, the winding diameter of the V-belt around each sheave is adjusted to adjust the speed change ratio between the sheaves in a continuously variable manner.

Normally, the primary and secondary sheaves are each formed by a fixed flange and a moveable flange with a V-groove formed therebetween. The moveable flange can move in the axial direction of the primary or secondary shaft. The groove width adjustment mechanism moves the moveable flange to adjust the speed change ratio in a continuously variable manner.

There is a known V-belt type CVT in which an electric motor is used to move the moveable flange of the primary sheave, thereby adjusting groove width. Movement driving force of the electric motor moves the moveable flange in either a direction that narrows the width of the groove of the primary sheave (a Top side) or a direction that widens the width of the groove of the primary sheave (a Low side), thereby allowing adjustment of the groove width (for example, refer to Japanese Patent No. 3043061). This V-belt type CVT is suitable for use with a straddle-type vehicle (for example, a motorcycle).

A scooter motorcycle provided with a mechanism for electronically controlling a V-belt type automatic CVT automatically changes the speed change ratio of the CVT without requiring the rider to perform any operations (for example, JP-A-62-175228). More specifically, a pre-set program (map) is performed to automatically change the speed change ratio of the CVT based on information such as vehicle speed, engine speed, accelerator opening degree, or the like. Thus, the rider's maneuvering operations are simpler, which has recently led to adoption of automatic CVTs in various vehicle types.

A motorcycle provided with an automatic CVT that performs this kind of electronic control includes a deceleration lever that riders use to input their intentions. Various types of deceleration levers are known. One deceleration lever allows the speed change ratio of the CVT to be manually set in accordance with the position of the deceleration lever (for example, refer to Japanese Patent No. 2950957). Another deceleration lever is provided with a switch that allows down shift to be performed manually by forcibly changing the speed change ratio (for example, refer to JP-A-62-175228). These known devices allow the advantages of the automatic CVT to be exploited while also allowing the intentions of the rider to be used as a basis for continually obtaining a desired speed change ratio. In addition, driving with use of engine brake, and advance down shift can be performed, thereby reducing the problem of unresponsive acceleration.

The inventor has developed a V-belt type CVT that is provided with a control program (a kick down) that down shifts in accordance with a rider's intentions. Use of the V-belt type CVT provided with the kick down in various types of running condition was investigated. Amongst these, it was found that, if kick down is performed when accelerating again after deceleration, there are occasions when unnecessary racing of the engine causes an un-smooth acceleration feeling.

SUMMARY OF THE INVENTION

The invention has been devised in light of these problems. A continuously variable transmission (CVT) of the invention has a speed change ratio that is controlled by a control device. The CVT includes a kick down operation member. The control device is set with a normal mode that sets a control target value, a kick down mode that sets the control target value further to a Low side than the normal mode, and a limit value of the control target value used during re-acceleration. In response to operation of the kick down operation member, the control target value is set by the kick down mode instead of the normal mode set in the control device. If acceleration is performed after a throttle is fully closed during control of the kick down mode, the control target value is set so as not to pass to the Low side of the limit value of the control target value used during re-acceleration.

The control device may be set with a plurality of levels of kick down modes that set the control target value progressively further to the Low side than the normal mode. In this configuration, in response to operation of the kick down operation member, the control target value is set by one of the kick down modes among the plurality of levels of kick down modes instead of the normal mode set in the control device, and if acceleration is performed after the throttle is fully closed during control of the given kick down mode, the control target value is set so as not to pass to the Low side of the limit value of the control target value used during re-acceleration.

For example, the control device may determine whether acceleration is performed after the throttle is fully closed using a sensor that detects an operation amount of an accelerator operation member.

In addition, the control device may perform control such that if acceleration is performed after the throttle is fully closed during control of the kick down mode, and if the control target value set by the kick down mode is further to a Top side than the limit value of the control target value used during re-acceleration, the given control target value is set as the control target value, and if the control target value set by the kick down mode is further to the Low side than the limit value of the control target value used during re-acceleration, the limit value of the control target value used during re-acceleration is set as the control target value instead of the given control target value.

Moreover, if acceleration is performed after the throttle is fully closed during control of the kick down mode, the control target value may be set by the kick down mode that is set furthest to the Top side among the plurality of levels of kick down modes.

Furthermore, if acceleration is performed after the throttle is fully closed during control of the kick down mode, the control target value may be set by the kick down mode, among the plurality of levels of kick down modes, that is set further to the Top side than the kick down mode used immediately prior to acceleration after the throttle is fully closed.

In addition, the control device may perform control such that the control target value is set such that an engine speed control target value does not temporarily fall immediately after acceleration if acceleration is performed after the throttle is fully closed during control of the kick down mode.

Furthermore, if the kick down mode set in the control device sets the control target value based on an engine speed, the control device may perform control such that, if acceleration is performed after the throttle is fully closed during control of the kick down mode, when accelerating, if an engine speed control target value set by the kick down mode is small as compared to the engine speed control target value set immediately prior to acceleration and the throttle is not fully open, the engine speed control target value set immediately prior to acceleration continues to be used until the given engine speed control target value becomes higher than the engine speed control target value set immediately prior to acceleration.

In addition, the control device may perform control such that the control target value is set not to temporarily vary to the Top side immediately after acceleration if acceleration is performed after the throttle is fully closed during control of the kick down mode.

Moreover, the control device may perform control such that if acceleration is performed after the throttle is fully closed during control of the kick down mode, and when the control target value set by the kick down mode used when accelerating is to the Top side of the control target value used immediately prior to acceleration, and the throttle is not fully open, the control target value used immediately prior to acceleration continues to be used until, when accelerating, the control target value set by the kick down mode passes to the Low side of the control target value used immediately prior to acceleration.

The CVT may be connected to an engine of a straddle-type vehicle having an output controlled in accordance with operation of an accelerator operation member, and a control device may control a speed change ratio of the CVT.

The control device performs control such that, in response to operation of the kick down operation member, the control target value is set by the kick down mode instead of the normal mode, and if acceleration is performed after a throttle is fully closed during control of the kick down mode, the control target value is set so as not to pass to the Low side of the limit value of the control target value used during re-acceleration. As a result, the control device appropriately controls the CVT when accelerating after the throttle is fully closed, thereby inhibiting unnecessary engine racing.

Furthermore, the control device performs control such that, if acceleration is performed after the throttle is fully closed during control of the kick down mode, the control target value is set by the kick down mode, among the plurality of levels of kick down modes, that is set further to the Top side than the kick down mode used immediately prior to acceleration after the throttle is fully closed. With this configuration, it is possible to further use kick down control when accelerating after the throttle is fully closed. In addition, when the control device performs control such that the control target value is set such that an engine speed control target value does not temporarily fall immediately after acceleration if acceleration is performed after the throttle is fully closed during control of the kick down mode, smoother acceleration is achieved.

Other features and advantages of the invention will be apparent from the following detailed description, taken in conjunction with the accompanying drawings that illustrate, by way of example, various features of embodiments of the invention.

DETAILED DESCRIPTION OF THE INVENTION

A straddle-type vehicle that is equipped with a continuously variable transmission (CVT) according to an embodiment of the invention is now described with reference to the drawings. The invention is not limited to the following embodiment.

Figure 1:
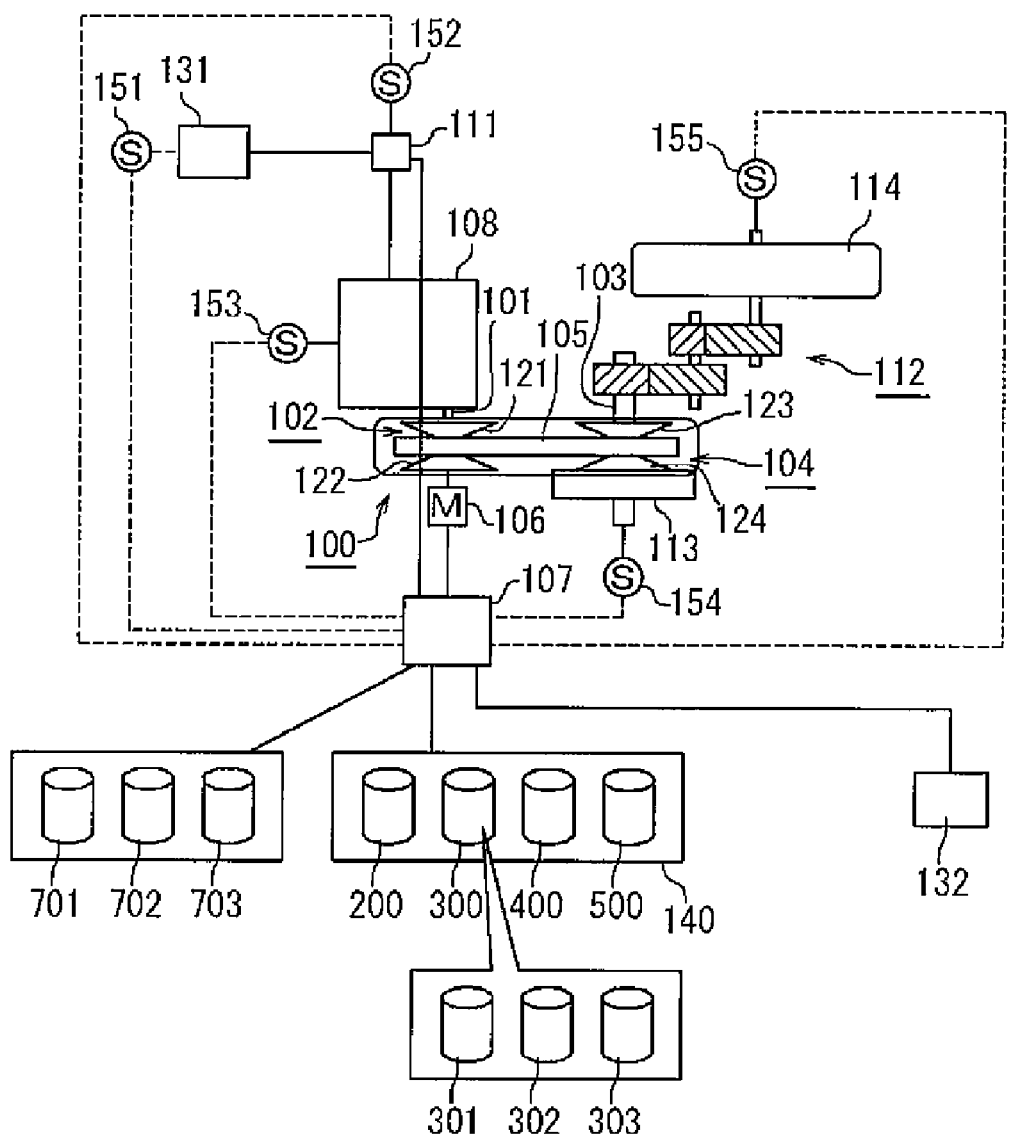
FIG. 1 is a diagram of a continuously variable transmission (CVT) according to an embodiment of the invention.
Figure 2:
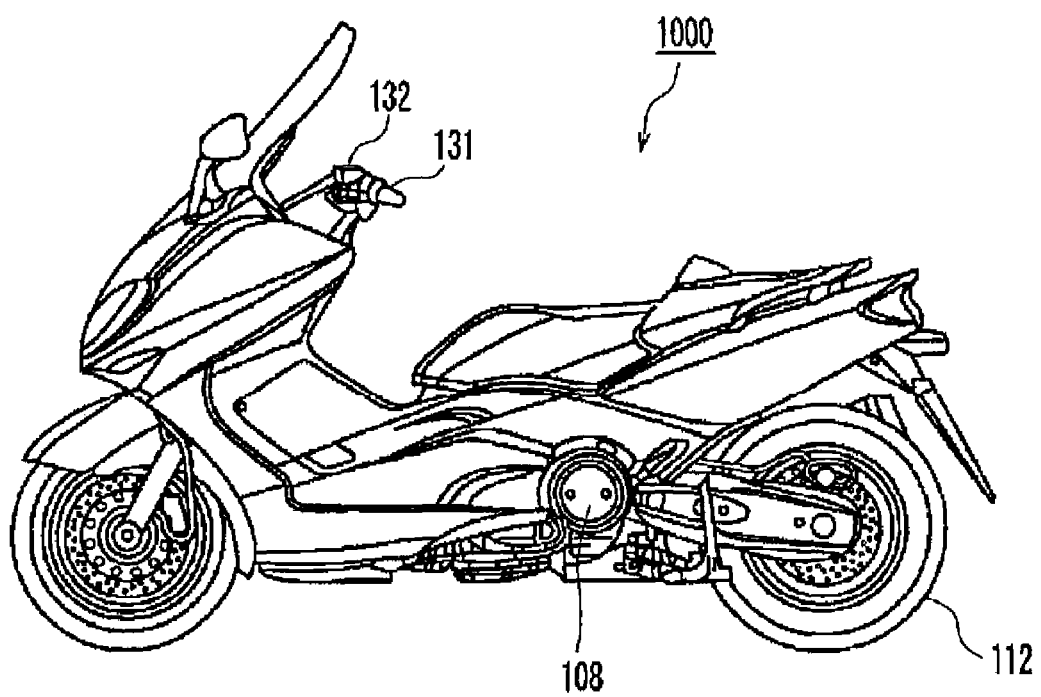
FIG. 2 is a side view of a straddle-type vehicle according to the embodiment of the invention.

FIG. 1 shows an outline of the structure of a CVT 100. CVT 100 includes a primary shaft 101 (crank shaft), a primary sheave 102, a secondary shaft 103, a secondary sheave 104, a V-belt 105, an actuator (motor) 106 and a control device 107. CVT 100 is mounted in a straddle-type vehicle 1000 as shown in FIG. 2. In FIG. 1, reference numeral 108 denotes an engine, 111 denotes a throttle valve, 112 denotes a speed reduction mechanism, 113 denotes a clutch and 114 a driving wheel.

Driving force generated by engine 108 is transmitted to driving wheel 114 (rear wheel) via CVT 100 and speed reduction mechanism 112. In this embodiment, clutch 113 is a centrifugal clutch. When the vehicle speed becomes roughly less than a determined value during deceleration, transmission of power from CVT 100 to secondary shaft 103 is disengaged.

CVT 100, as shown in FIG. 1, includes primary sheave 102 attached to primary shaft 101, secondary sheave 104 attached to secondary shaft 103, and V-belt 105 wound around primary sheave 102 and secondary sheave 104.

Primary sheave 102 includes a fixed flange 121 and a moveable flange 122. The groove width of primary sheave 102 can be adjusted by motor 106 that is controlled by control device 107. Secondary sheave 104 includes a fixed flange 123 and a moveable flange 124. A spring is incorporated within secondary sheave 104, and functions to adjust groove width in accordance with the groove width of primary sheave 102.

Figure 3:
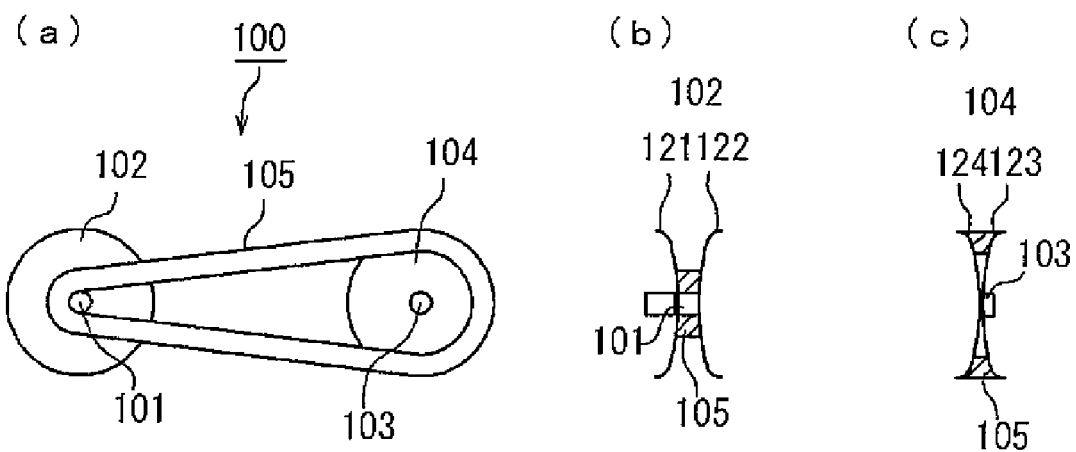
FIG. 3(a) shows the CVT according to the embodiment of the invention when it is in a low gear (Low)
FIG. 3(b) shows a primary sheave thereof.
FIG. 3(c) shows a secondary sheave thereof.

FIG. 3(a) shows CVT 100 when it is in a low gear (Low). In primary sheave 102, as can be seen from FIG. 3(b), a gap between fixed flange 121 and moveable flange 122 is large, and V-belt 105 is positioned to the inner circumferential side (in the vicinity of primary shaft 101) of primary sheave 102. On the other hand, in secondary sheave 104, as can be seen from FIG. 3(c), a gap between fixed flange 123 and moveable flange 124 is small, and V-belt 105 is positioned at the outer circumferential side of secondary sheave 104. In this state, the speed of rotation of primary shaft 101 is reduced and is transmitted to secondary shaft 103. Thus, in this state, a low speed, comparatively large driving force is transmitted.

Figure 4:
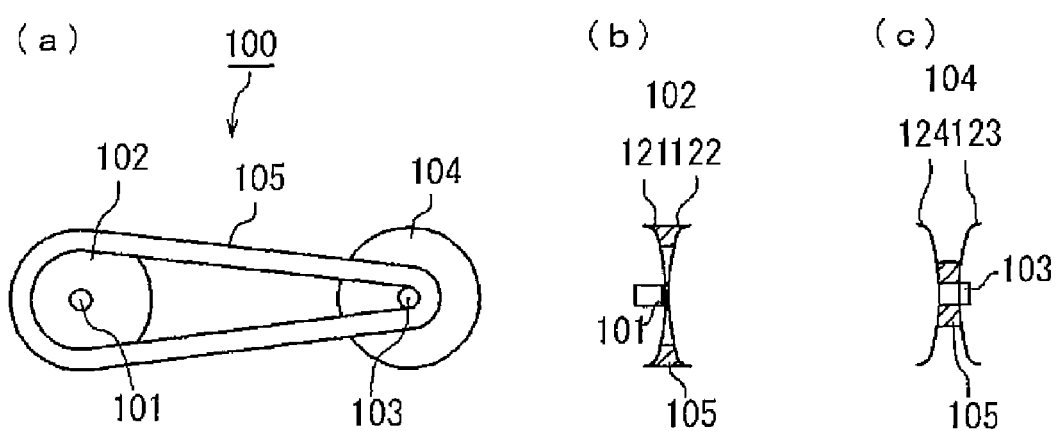
FIG. 4(a) shows the CVT according to the embodiment of the invention when it is in a top gear (Top)
FIG. 4(b) shows a primary sheave thereof.
FIG. 4(c) shows a secondary sheave thereof.

FIG. 4(a) shows CVT 100 when it is in a top gear (Top). In primary sheave 102, as can be seen from FIG. 4(b), the gap between fixed flange 121 and moveable flange 122 is small, and V-belt 105 is positioned to the outer circumferential side of primary sheave 102. On the other hand, in secondary sheave 104, as can be seen from FIG. 4(c), the gap between fixed flange 123 and moveable flange 124 is large, and V-belt 105 is positioned at the inner circumferential side (in the vicinity of secondary shaft 103) of secondary sheave 104. In this state, the speed of rotation of primary shaft 101 is increased and is transmitted to secondary shaft 103. Thus, in this state, a high speed, comparatively small driving force is transmitted.

CVT 100 drives motor 106, in accordance with a target value setting program that is pre-set in control device 107, and thereby adjusts the groove width of primary sheave 102 to adjust the speed change ratio. Kick down takes place when a down shift is performed in accordance with the rider's intentions, and is achieved using control based on the target value setting program.

The inventor has confirmed that, when using V-belt type CVT 100 provided with kick down of this type, if kick down is performed when accelerating again after deceleration, there are occasions when unnecessary racing of the engine causes an un-smooth acceleration feeling. This problem has no detrimental affect on the safety of the straddle-type vehicle. However, the inventor has devised various modifications of the CVT that address this problem and that promote improved ride comfort and maneuverability.

Next, the modification of the CVT according to the embodiment of the invention is explained. Referring to FIG. 2, in this embodiment, straddle-type vehicle 1000 includes an accelerator operation member 131 and a kick down operation member 132.

Accelerator operation member 131 is used by the rider to control the output of engine 108 and may be formed by an accelerator attached to a handle, or an accelerator grip. Control device 107, as can be seen from FIG. 1, controls the opening degree of throttle valve 111 in accordance with operation of accelerator operation member 131, thereby controlling the output of engine 108.

Kick down operation member 132 is operated by the rider and performs a kick down mode. Kick down operation member 132 is provided separately from accelerator operation member 131, and may be, for example, a kick down (KD) button that is located at a position that takes into consideration rider operability and that is easy for the rider to operate. Control device 107 executes the kick down mode in accordance with operation of kick down operation member 132 by the rider.

CVT 100, as shown in FIG. 1, is connected to engine 108, and is provided with control device 107. Control device 107 controls CVT 100 based on a control target value. Control device 107 may be a micro computer including a CPU, a ROM, a RAM, and a timer, and is provided with a memory portion that memorizes data, programs and the like, and a processing portion that performs processing such as computation in accordance with the programs.

Control device 107, as shown in FIG. 1, is electronically connected to various sensors such as an accelerator operation sensor 151, a throttle opening degree sensor 152, an engine speed sensor 153, a secondary sheave rotation speed sensor 154 and a vehicle speed sensor 155, and obtains required information about the states of various variables of the straddle-type vehicle from the sensors.

Accelerator operation sensor 151 detects information about the operation of the accelerator operation member 131. Throttle opening degree sensor 152 is provided in the vicinity of a support shaft of throttle valve 111 and detects a rotational angle of throttle valve 111 as the throttle opening degree. Engine speed sensor 153 is provided in the vicinity of the crank shaft (primary shaft 101) of engine 108 to detect the engine speed. Secondary sheave rotation speed sensor 154 is provided in the vicinity of secondary shaft 103 and detects the rotation speed of secondary sheave 104. Vehicle speed sensor 155 is provided on and detects the rotation speed of a drive shaft of driving wheel 114. The vehicle (running) speed of straddle-type vehicle 1000 may be detected based on the rotation speed of the drive shaft of driving wheel 114 detected by vehicle speed sensor 155.

A normal mode 200, a kick down mode 300 and a limit value 400 that is a control target value used when re-accelerating are memorized in control device 107. A limit value 500 that is used when the throttle is fully closed is also memorized in control device 107. A target value setting portion 140 that sets a control target value that controls CVT 100 is provided in the memory portion of control device 107. Normal mode 200, kick down mode 300, limit value 400 and limit value 500 are respectively set in target value setting portion 140.

Normal mode 200 sets the control target value that is used during normal running when kick down is not being performed. Kick down mode 300 sets the control target value when kick down is being performed such that the control target value is Low as compared to normal mode 200. Normal mode 200 and kick down mode 300 are respectively memorized in the memory portion of control device 107, and are programs that set the control target value for control device 107.

Normal mode 200 and kick down mode 300 respectively determine the control target value based on vehicle information from throttle opening degree sensor 152, engine speed sensor 153, secondary sheave rotation speed sensor 154 and vehicle speed sensor 155. Control device 107 drives motor 106 based on the control target value, thereby controlling the groove width of primary sheave 102.

In addition, normal mode 200 sets the control target value to an engine speed for a vehicle speed and controls the speed change ratio of CVT 100 such that the given control target value is achieved. Kick down mode 300 multiplies the target value for the engine speed set by normal mode 200 by a pre-determined constant ratio (a down ratio), thereby setting the control target value to be Low as compared to normal mode 200.

In response to operation of kick down operation member 132, control device 107 sets the control target value using kick down mode 300 instead of using normal mode 200 set in target value setting portion 140.

Limit value 400 limits the control target value of CVT 100 that is set when accelerating after the throttle is fully closed. The phrase "accelerating after the throttle is fully closed" indicates an operation in which, after the throttle (accelerator) has been closed to reduce speed, the throttle (accelerator) is opened to accelerate.

Limit value 400 functions when the control target value is set by the kick down mode. More specifically, in normal mode 200, taking into consideration fuel efficiency performance etc., the control target value of CVT 100 is set such that racing of the engine does not occur. In contrast to this, kick down mode 300 sets the target value by multiplying the speed change characteristic (speed change ratio) of normal mode 200 by the constant ratio. As a result, the problem of engine racing can occur.

Limit value 400 is set to a control target value that suitably controls CVT 100 such that racing of the engine does not occur. Limit value 400 indicates a control target value that suitably controls CVT 100 such that engine racing is inhibited, and does not signify an engine limiter.

For example, limit value 400 may be set based on pre-testing of the same model of straddle-type vehicle mounted with CVT 100, and may be set to a control target value that will suitably control CVT 100 such that engine racing does not occur when re-accelerating after the throttle is completely closed.

In addition, limit value 500 that is used when the throttle is fully closed is also set. Limit value 500 limits the control target value of CVT 100 that is set when the throttle is fully closed. The phrase "throttle is fully closed" indicates a state where the throttle is shut.

Limit value 500 is set in advance taking into consideration the effectiveness of inhibiting slip of primary sheave 102 and V-belt 105 of CVT 100 that results from the action of engine brake when decelerating with the throttle (accelerator) closed. Limit value 500 may be set, for example, taking into consideration the results of simulations or tests on the actual device. Although limit value 500 is described as being set in this embodiment, limit value 500 need not be set.

Figure 5:
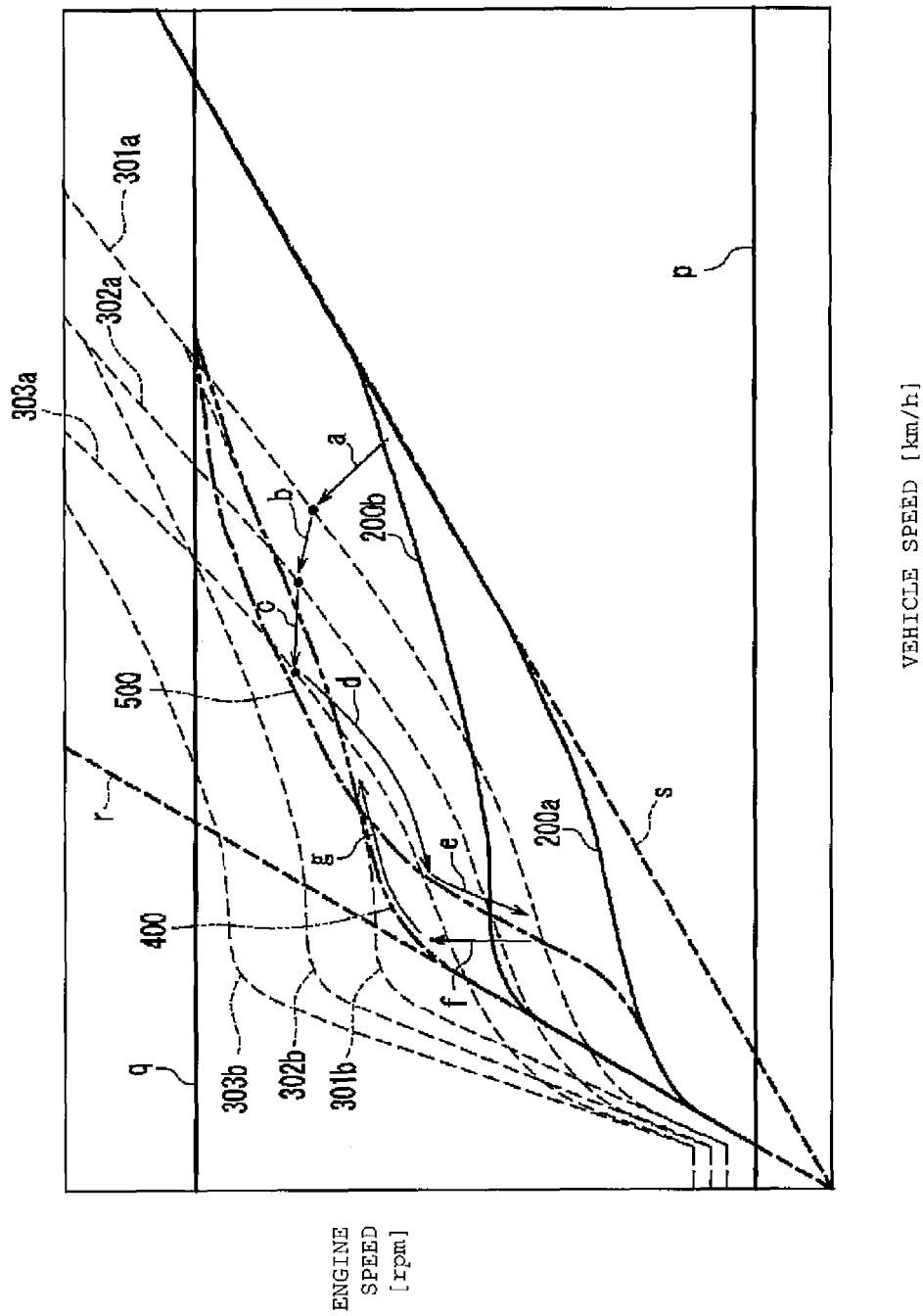
FIG. 5 shows a target value setting program (map) set in a control device of the CVT according to the embodiment of the invention.

FIG. 5 shows normal mode 200, kick down mode 300, limit value 400 and limit value 500 that are set in target value setting portion 140. FIG. 5 shows the relationship of the speed (target value) of engine 108 with respect to the vehicle speed for each of the target value setting programs.

The vertical axis of FIG. 5 shows the engine speed, and the horizontal axis shows the vehicle speed. As can be seen from FIG. 5, if the vehicle speed is the same, as the engine speed becomes higher, the speed change ratio of the CVT is controlled to change toward the Low side. If the engine speed is the same, as the vehicle speed becomes slower, the speed change ratio of the CVT is controlled to change toward the Low side.

The speed of engine 108 can be derived, for example, using computation based on the detection signal of engine speed sensor 153. The vehicle speed can be derived, for example, using computation based on the detection signal of secondary sheave rotation speed sensor 154 or vehicle speed sensor 155.

In FIG. 5, 'p' indicates a lower limit of engine speed, 'q' indicates an upper limit of engine speed, 'r' indicates the relationship between vehicle speed and the speed of engine 108 when the groove width of primary sheave 102 is furthest to the Low side, and 's' indicates the relationship between vehicle speed and the speed of engine 108 when the groove width of primary sheave 102 is furthest to the Top side.

Normal mode 200 is operative between 200a and 200b in FIG. 5. The control target value of the engine speed that is set when the throttle is fully closed when running normally when kick down control is not being performed is indicated by 200a, and the control target value of the engine speed that is set when the throttle is fully open when running normally when kick down control is not being performed is indicated by 200b.

The phrase "when the throttle is fully closed" indicates a state when the throttle (accelerator) is shut, and the phrase "when the throttle is fully open" indicates a state when the throttle (accelerator) is open as far as possible. The states "when the throttle is fully closed" and "when the throttle is fully open" are determined based on operating information of the accelerator operation member obtained from accelerator operation sensor 151. If the throttle valve moves in association with operation of the accelerator, the states may be determined using throttle opening degree sensor 152.

Kick down mode 300 is set with a plurality of levels (three in this example) that set the control target value progressively further to the Low side of normal mode 200.

A first kick down mode 301 sets the control target value furthest to the Top side. First kick down mode 301 sets the control target value between 301a and 301b of FIG. 5. The control target value of the engine speed that is set under the control of first kick down mode 301 when the throttle is fully closed is indicated by 301a, and the control target value of the engine speed that is set under the control of first kick down mode 301 when the throttle is fully open is indicated by 301b. In FIG. 5, a section of control target value 301b of the engine speed that is set under the control of first kick down mode 301 when the throttle is fully open, and a section of limit value 400 of the control target value used when re-accelerating, are the same.

A second kick down mode 302 sets the control target value further to the Low side than first kick down mode 301. Second kick down mode 302 sets the control target value between 302a and 302b of FIG. 5. The control target value of the engine speed that is set under the control of second kick down mode 302 when the throttle is fully closed is indicated by 302a, and the control target value of the engine speed that is set under the control of second kick down mode 302 when the throttle is fully open is indicated by 302b.

A third kick down mode 303 sets the control target value further to the Low side than second kick down mode 302. Third kick down mode 303 sets the control target value between 303a and 303b of FIG. 5. The control target value of the engine speed that is set under the control of third kick down mode 303 when the throttle is fully closed is indicated by 303a, and the control target value of the engine speed that is set under the control of third kick down mode 303 when the throttle is fully open is indicated by 303b.

FIG. 5 is intended to make understanding of normal mode 200 and kick down modes 300 easier. As described above, each kick down mode 300 sets the control target value further to the Low side than normal mode 200 by multiplying the target value of the engine speed set in normal mode 200 by a pro-determined constant ratio (a down ratio). Moreover, as described above, the limit value of the control target value that is used during re-acceleration is indicated by 400, and the limit value that is used when the throttle is fully closed is indicated by 500.

Target value setting portion 140 sets the control target value using kick down mode 300 instead of normal mode 200, in accordance with operation of kick down operation member 132. Then, if the vehicle accelerates after the throttle has been fully closed during control of kick down mode 300, target value setting portion 140 sets the control target value such that it does not go beyond the limit value of the control target value used during re-acceleration to the Low side.

A plurality of levels (301, 302, 303) of kick down mode 300 are set. One of the kick down modes 301, 302, 303 is used in accordance with operation of kick down operation member 132. Each time the rider operates kick down operation member 132, the kick down mode that sets the control target value progressively to the Low side is used in accordance with the rider's operation, thereby gradually performing down shift.

When normal mode 200 or kick down mode 301, 302, 303 is used, the control target value of the engine speed is derived using computation based on information for the vehicle speed and the throttle opening degree.

More particularly, the position on the horizontal axis of FIG. 5 is determined based on the information for vehicle speed. In addition, the control target value of the engine speed is set between the control target value used when the throttle is fully closed (200a, 301a, 302a, 303a) and the control target value used when the throttle is fully open (200b, 301b, 302b, 303b) by multiplication using a determined coefficient that corresponds with the throttle (accelerator) opening degree. In this case, as the throttle opening degree becomes smaller, the control target value is set nearer to the control target value (200a, 301a, 302a, 303a) used when the throttle is fully closed. As the throttle opening degree becomes larger, the control target value is set nearer to the control target value (200b, 301b, 302b, 303b) used when the throttle is fully open.

Control device 107 uses information about temporal changes in the vehicle speed and the throttle opening degree to repeatedly perform computation and continually update the control target value of the engine speed, thereby controlling the speed change ratio of CVT 100. In order to inhibit engine racing, and achieve smooth acceleration when accelerating after the throttle has been fully closed, control device 107 performs a first control 701, a second control 702 and a third control 703.

In first control 701, target value setting portion 140 sets the control target value such that limit value 400 is not passed to the Low side when accelerating after the throttle has been fully closed during control of kick down mode 300. In first control 701, when the control target value is set by kick down mode 300 to be further to the Top side than limit value 400, this control target value is set as the control target value. However, when the control target value is set by kick down mode 300 to be further to the Low side than limit value 400, limit value 400 is set at the control target value.

Figure 6:
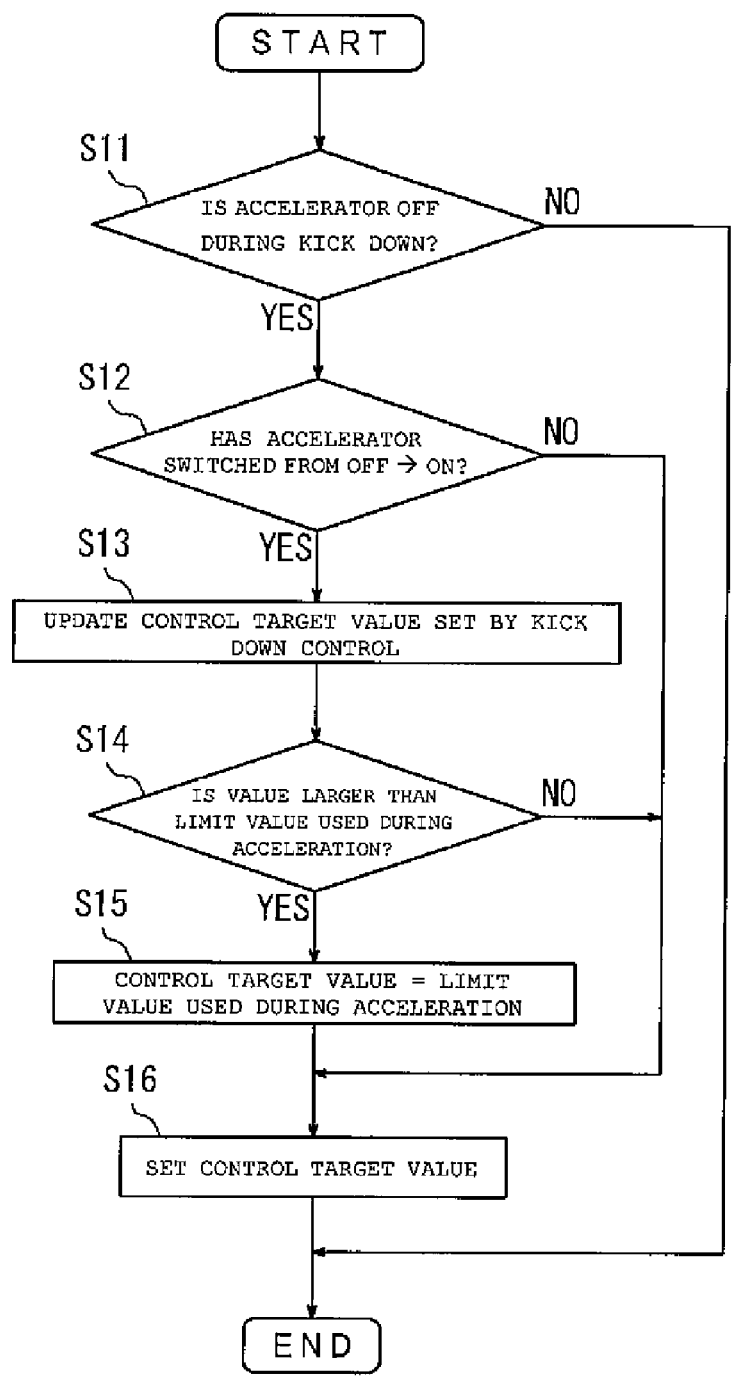
FIG. 6 is a flow chart that shows a first control of the CVT according to the embodiment of the invention.

The control flow of first control 701 is explained with reference to FIG. 6. First, at determination step S11, it is determined whether the accelerator is OFF during control of kick down mode 300. Whether kick down mode 300 is presently performing control may be determined, for example, based on information about the performance of the kick down control that accords with the operation of kick down operation member 132. Whether the accelerator is OFF may be determined based on information from accelerator operation sensor 151 or the like.

If YES is determined at determination step S11, then the routine proceeds to determination step S12. However, if NO is determined at determination step S11, first control 701 is ended. At determination step S12, it is determined whether the vehicle is accelerating after the throttle has been fully closed. In the example of FIG. 6, whether the vehicle is accelerating after the throttle has been fully closed is determined based on whether switching from accelerator OFF to accelerator ON has taken place. Whether switching from accelerator OFF to accelerator ON has taken place is determined based on information from accelerator operation sensor 151.

If NO is determined at determination step S12, step S16 is performed in which the control target value of the engine speed set in the kick down mode when the throttle is fully closed is set as the final control target value of the engine speed. If YES is determined at determination step S12, the routine proceeds to step S13.

At step S13, the control target value set by kick down mode 300 is updated. More specifically, the control target value of the engine speed set by kick down mode 300 used when the accelerator was switched to ON is computed, and set as the updated control target value. Then, determination step S14 is performed.

At determination step S14, it is determined whether the control target value of the engine speed updated at step S13 is larger than limit value 400. In other words, it is determined whether the control target value set by kick down mode 300 is further to the Low side than limit value 400.

If NO is determined at determination step S14, the control target value of the engine speed updated at step S13 is not larger than limit value 400. In this case, the given control target value updated at S13 is set as the control target value in step S16.

If YES is determined at determination step S14, the control target value of the engine speed updated at step S13 is larger than limit value 400. In this case, step S15 is performed. Step S15 sets limit value 400 as the control target value. In other words, instead of the control target value of the engine speed set by kick down mode 300, limit value 400 is set as the control target value. Thus, as a result of step S15, limit value 400 becomes the control target value.

At step S16, the control target value of CVT 100 is set based on the processing of steps S12, S14 and S15.

Next, first control 701 is explained with reference to FIG. 5. When, for example, the throttle is closed to decelerate during normal running (under control of the normal mode) when kick down control is not being performed, the rider may sometimes repeatedly operate kick down operation member 132 in order to increase the effect of engine brake. For example, if kick down control is performed three times, as indicated by arrows a-c shown in FIG. 5, the used kick down control will shift from first kick down mode 301, to second kick down mode 302, to third kick down mode 303. Then, as shown by arrow d, the control target value will continue to be set in accordance with third kick down mode 303 while the vehicle decelerates.

As described above, limit value 500 that is used when the throttle is fully closed is set. Control device 107 sets the control target value of CVT 100 to limit value 500 if, when the throttle is closed to decelerate, the control target value of CVT 100 set by kick down mode 300 passes to the Low side of limit value 500.

Thus, under control of third kick down mode 303, if control target value 303a of the engine speed set when the throttle is fully closed reduces to a vehicle speed that passes to the Low side of limit value 500, limit value 500 is set as the control target value of CVT 100. As a result, as shown by arrow e, the control target value of CVT 100 is set in line with limit value 500.

First control 701 is performed when accelerating after the throttle has been fully closed under control of the kick down mode. Accordingly, as shown by arrow e, when the control target value is set in line with limit value 500, and the accelerator is switched from OFF to ON, first control 701 is performed.

When the accelerator is switched from OFF to ON, and the throttle is opened, the limit established by limit value 500 is deactivated. Thus, the control target value is set by third kick down mode 303. As a result, the control target value of the engine speed increases as shown by arrow f.

At this time, if the control target value set by third kick down mode 303 passes to the Low side of limit value 400, first control 701 sets limit value 400 as the control target value. This is performed by the determination processing of determination step S14 of FIG. 6. Accordingly, if the control target value set by third kick down mode 303 passes to the Low side of limit value 400, limit value 400 is set as the control target value as shown by arrow g in FIG. 5. Thus, the control target value of CVT 100 is not able to pass below and be set to the Low side of limit value 400. In cases when the control target value set by third kick down mode 303 does not pass to the Low side of limit value 400, the control target value set by third kick down mode 303 is set as the control target value.

As described above, in first control 701, by the determination processing of determination step S14, when the control target value set by kick down mode 300 passes to the Top side of limit value 400, the given control target value is set as the control target value. However, when the control target value set by kick down mode 300 passes to the Low side of limit value 400, limit value 400 is set as the control target value. As a result, the control target value is not able to pass below and be set to the Low side of limit value 400. Therefore, when accelerating after the throttle has been fully closed under control of the kick down mode, CVT 100 can be controlled such that limit value 400 is not passed to the Low side, and thus engine racing is inhibited.

In FIG. 5, when the throttle is closed to decelerate during normal running (under control of the normal mode) when kick down control is not being performed, the rider may sometimes repeatedly operate kick down operation member 132 in order to increase the effect of engine brake. First control 701 can function in circumstances other than this. For example, first control 701 can also function when, under control of the kick down mode, the throttle (accelerator) is closed to decelerate, and then the throttle (accelerator) is opened to accelerate.

This completes the explanation of first control 701. An example has been described in which a plurality of kick down mode levels are set in target value setting portion 140. However, first control 701 controls CVT 100 such that limit value 400 is not passed to the Low side when accelerating after the throttle has been fully closed under control of the kick down mode. Accordingly, it is not essential that a plurality of kick down modes levels are set.

Second control 702 is now explained. When a plurality of kick down mode levels are set in target value setting portion 140 as described above, normally, when the vehicle accelerates after the throttle has been fully closed during control of the kick down mode, the kick down mode used before accelerating is maintained. At this time, if the kick down control has already been used multiple times prior to acceleration, there are occasions when use of another kick down is restricted after acceleration.

Second control 702 sets the control target value by using the level of kick down mode 300 that is set furthest to the Top side when accelerating after the throttle has been fully closed during control of kick down mode 300. In other words, when accelerating after the throttle has been fully closed during control of kick down mode 300, the control target value is set by the level of kick down mode 300 that is set furthest to the Top side. As a result, after acceleration, it is possible to kick down again in response to the rider's request.

The control flow of second control 702 is explained with reference to FIG. 7. First, at determination step S21, it is determined whether the accelerator is OFF during control of kick down mode 300. If YES is determined at determination step S21, then the routine proceeds to determination step S22. However, if NO is determined at determination step S21, second control 702 is ended.

At determination step S22, it is determined whether the vehicle is accelerating after the throttle has been fully closed. In the example of FIG. 7, whether the vehicle is accelerating after the throttle has been fully closed is determined based on whether switching from accelerator OFF to accelerator ON has taken place.

If NO is determined at determination step S22, the control target value set under the control of the given kick down mode is set as the final control target value in step S25. If YES is determined at determination step (S22), the routine proceeds to step S23.

At step S23, the kick down mode shifts to the first kick down mode that is set furthest to the Top side among the plurality of levels of kick down mode (301, 302, 303). More particularly, at step S23, when the accelerator is switched to ON, the used kick down mode shifts to first kick down mode 301 that is set furthest to the Top side. The routine then proceeds to step S24.

At step S24, the control target value is computed using the first kick down mode that was shifted to at step S23.

At step S25, the control target value is set based on the processing at determination steps S22 and S24. More particularly, when it is determined that the vehicle is accelerating after the throttle has been fully closed at step S22, the kick down mode shifts to first kick down mode 301 at step S23. Then, at step S24, the control target value is computed by first kick down mode 301, and at step S25 the final control target value of CVT 100 is set.

Figure 8:
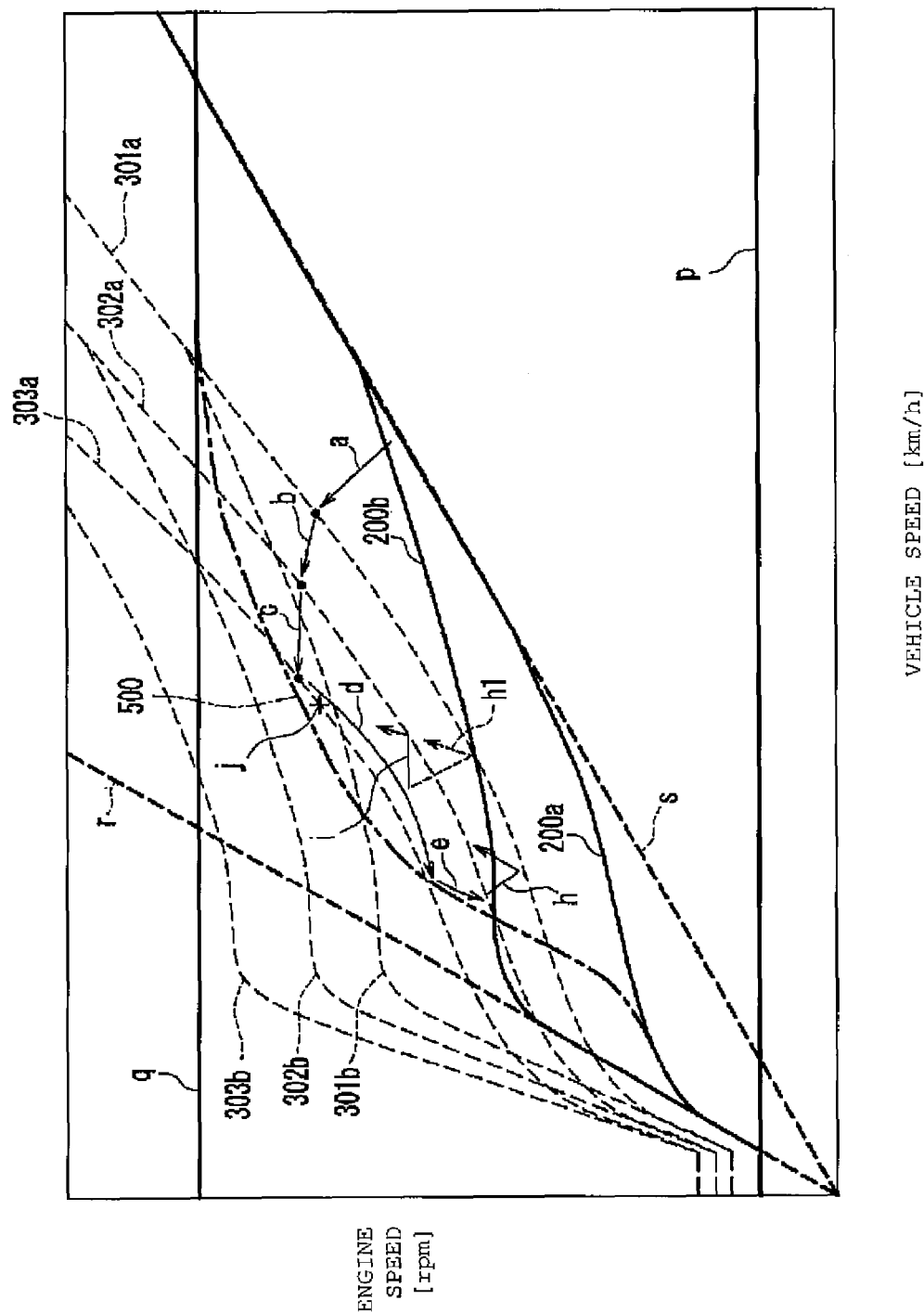
FIG. 8 shows a target value setting program (map) set in the control device of the CVT according to the embodiment of the invention.

Next, second control 702 is explained with reference to FIG. 8. In FIG. 8, when the accelerator is closed to decelerate during normal running, namely, under control of normal mode 200, when kick down control is not being performed, the rider may sometimes repeatedly operate kick down operation member 132 in order to increase the effect of engine brake.

For example, if kick down operation member 132 is operated three times, as indicated by arrows a-c of FIG. 8, the used kick down mode will shift from first kick down mode 301, to second kick down mode 302, to third kick down mode 303. Then, as shown by arrow d, the control target value will continue to be set in accordance with third kick down mode 303 while the vehicle decelerates.

As described above, limit value 500 that is used when the throttle is fully closed is set. Thus, if control target value 303a set by third kick down mode 303 passes to the Low side of limit value 500, limit value 500 is set as the control target value (arrow e).

Second control 702 is performed when accelerating after the throttle has been fully closed during control of the kick down mode. Accordingly, second control 702 is performed when the accelerator is switched from OFF to ON when the control target value is set in line with limit value 500 as shown by arrow e.

When the accelerator is switched from OFF to ON, the throttle is opened, and the limit established by limit value 500 is deactivated. Then, as shown in FIG. 7, step S23 is performed as a result of the determination of determination step S22, whereby the kick down mode shifts to first kick down mode 301. Then, the control target value is set by first kick down mode 301 (S24, S25).

The control target value set by first kick down mode 301 is determined by the extent of operation of accelerator operation member 131. Accordingly, for example, the control target value may be set as shown by arrow h in FIG. 8.

If, at this time, the rider feels that torque is inadequate, he/she can operate accelerator operation member 131 to increase the engine speed. Furthermore, the rider can operate kick down operation member 132 to request another kick down. According to the second control, when accelerating, the kick down mode shifts from third kick down mode 303 to first kick down mode 301. Thus, in the case that the rider requests another kick down, the kick down mode shifts in sequence from first kick down mode 301, to second kick down mode 302, to third kick down mode 303.

In this manner, in second control 702, when accelerating after the throttle has been fully closed during control of kick down mode 300, the control target value is set by the kick down mode that is set furthest to the Top side among the plurality of levels of kick down mode (301, 302, 303). As a result, after accelerating, it is possible to down shift in response to a request from the rider to kick down.

Moreover, as shown by arrow h in FIG. 8, the control target value of the engine speed set by first kick down mode 301 is low as compared to the control target value of the engine speed set by third kick down mode 303. As a result, second control 702 is effective in inhibiting engine racing.

Moreover, second control 702 functions when accelerating after the throttle has been fully closed during control of kick down mode 300. For example, as shown by dot line arrow h1 shown in FIG. 8, second control 702 can function when the throttle (accelerator) is opened to accelerate after the throttle (accelerator) has been closed to decelerate during control of third kick down mode 303. In this case, as a result of using second control 702, it is possible, after accelerating and once shifting to first kick down mode 301 has taken place, to down shift in response to a request from the rider to kick down. Moreover, as a result of using second control 702, the set control target value of the engine speed is low as compared to when control of third kick down mode 303 is performed. Accordingly, second control 702 is effective in inhibiting engine racing.

This completes the explanation of second control 702. Second control 702 may be modified in various ways. For example, an example has been given in which at step S23 in the control flow of FIG. 7, control is performed such that the kick down mode is shifted to first kick down mode 301. However, at step S23, the kick down mode may instead be shifted to a kick down mode among the plurality of levels of kick down mode (301, 302, 303) that is set further to the Top side than the kick down mode being used immediately prior to acceleration after the throttle has been fully closed.

According to this control, after accelerating after the throttle has been fully closed, it is possible to down shift in response to a request from the rider for another kick down. Furthermore, as compared to the case of continuing to use the kick down mode used immediately prior to acceleration after the throttle has been fully closed, it is possible to inhibit unnecessary engine racing.

In the case of accelerating after the throttle has been fully closed during control of kick down mode 300, for example, the kick down control can be deactivated and normal mode 200 used. However, in this control since the kick down is deactivated against the wishes of the rider, it is not possible to obtain torque that satisfies the rider's intentions when accelerating, and thus smooth acceleration is not achieved. Second control 702 allows smooth acceleration to be achieved in line with the rider's intention, and inhibits unnecessary engine racing.

CVT 100 may be controlled using the second control in combination with first control 701 that is set with limit value 400 such that, when accelerating after the throttle has been fully closed, limit value 400 is not exceeded. It is not essential to use the second control in combination with first control 701 that is set with limit value 400. In addition, it is not essential to set limit value 500 as described above.

Next, third control 703 is explained. When second control 702 functions, the kick down mode shifts to a kick down mode set further to the Top side. As a result, if control shifts from control of third kick down mode 303 to control of first kick down mode 301 as shown by arrow h1 in FIG. 8, the control target value of the engine speed becomes lower. Thus, in the case of accelerating after the throttle has been fully closed, the output torque is too small to satisfy the rider's intention, and the vehicle may not smoothly accelerate as the rider intends. In third control 703, this difficulty that occurs when using second control 702 is addressed, and control is performed such that the vehicle smoothly accelerates when accelerating after the throttle has been fully closed.

Third control 703 preferably sets the control target value such that the control target value of the engine speed does not temporarily fall immediately after accelerating. In addition, third control 703 preferably sets the control target value of the speed change ratio such that it does not temporarily vary to the Top side immediately after accelerating.

A timer function of control device 107 may be used to pre-set a time period. The time period may then be counted immediately following accelerating after the throttle has been fully closed, and the control target value of the CVT may be maintained for the pre-set time period.

As a result, even if second control 702 is being used, immediately after acceleration, the control target value of CVT 100 is not set excessively far to the Low side immediately after acceleration. Thus, when accelerating, torque that better matches the rider's intentions is output and smooth acceleration is achieved.

One embodiment of third control 703 is now explained. In this embodiment, when accelerating, if the control target value of the engine speed set by the kick down mode is low as compared to the control target value of the engine speed used immediately before accelerating and the throttle is not fully open, when accelerating, the control target value of the engine speed used immediately prior to acceleration is maintained until the control target value of the engine speed set by the kick down mode exceeds the control target value of the engine speed used immediately prior to acceleration.

Figure 7:
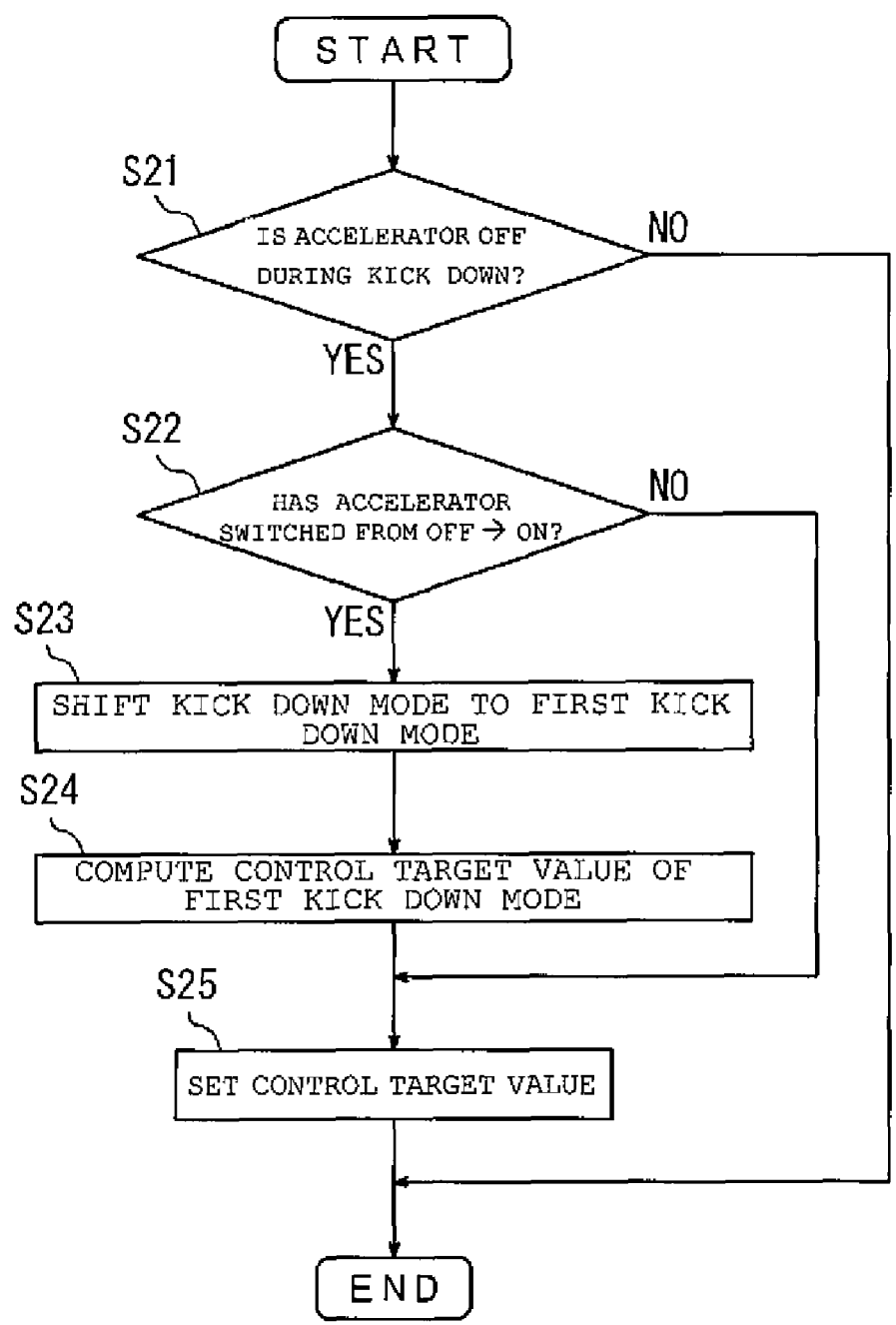
FIG. 7 is a flow chart that shows a second control of the CVT according to the embodiment of the invention.
Figure 9:
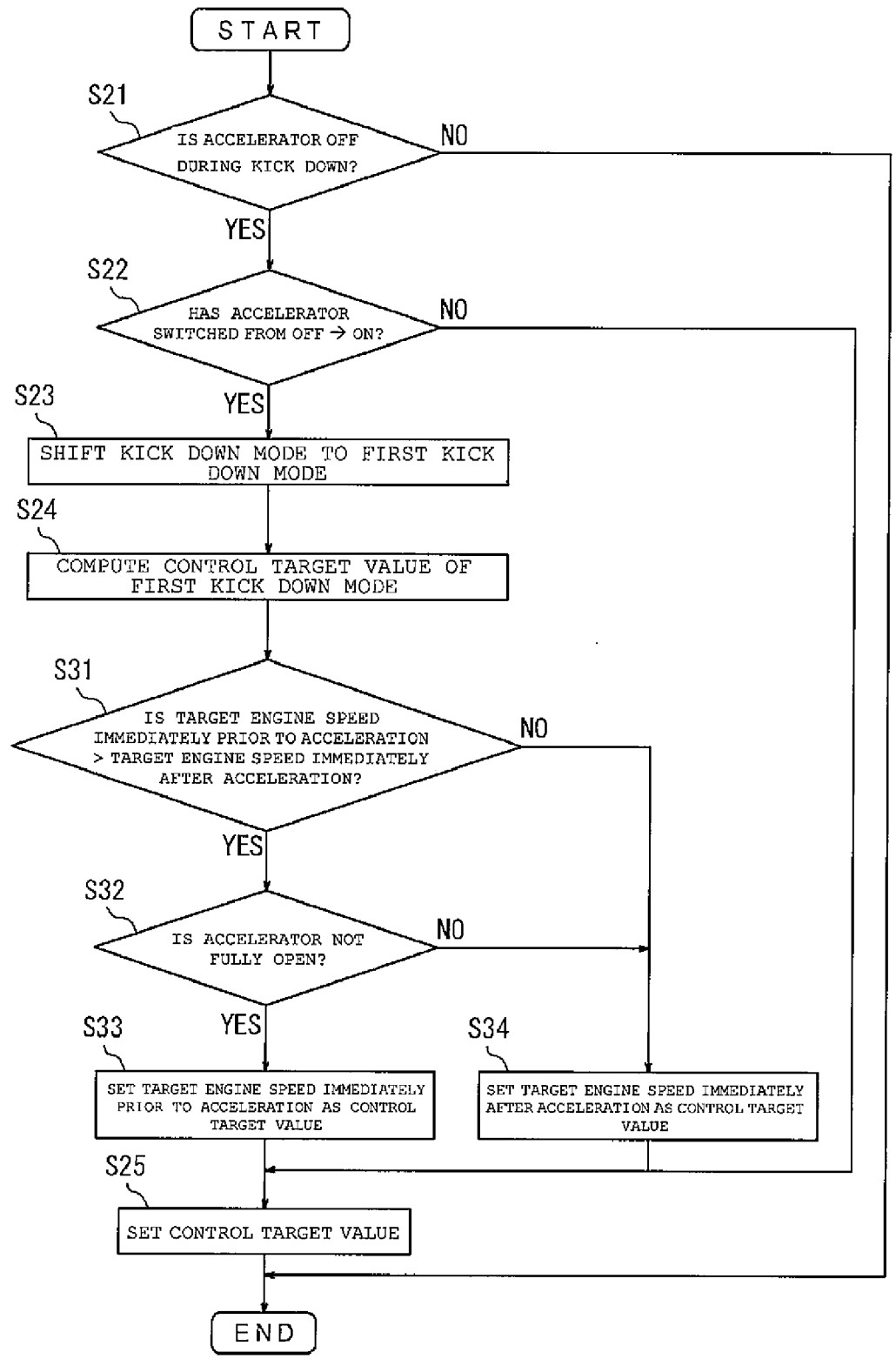
FIG. 9 is a flow chart that shows a third control of the CVT according to the embodiment of the invention.

Third control 703 can be set between, for example, steps S24 and S25 in the flow chart of FIG. 7 of the second control. FIG. 9 shows an example in which third control 703 is set between steps S24 and S25 of FIG. 7.

In this embodiment, after step S24, determination step S31 is performed to determine whether the control target value of the engine speed set immediately prior to acceleration is higher than the control target value of the engine speed set by the kick down mode that is shifted to immediately after acceleration. In FIG. 9, for sake of convenience, the control target value of the engine speed set immediately prior to acceleration is denoted as "target engine speed immediately prior to acceleration", and the control target value of the engine speed set by the kick down mode that is shifted to immediately after acceleration is denoted as "target engine speed immediately after acceleration".

If the control target value of the engine speed set immediately prior to acceleration is higher than the control target value of the engine speed set by the kick down mode that is shifted to immediately after acceleration, the determination at determination step S31 is YES and step S32 is performed.

Determination step S32 determines whether the throttle (accelerator) is fully open. If the control target value of the engine speed set immediately prior to acceleration is higher than the control target value of the engine speed set by the kick down mode that is shifted to immediately after acceleration, and the throttle (accelerator) is not fully open, the determination of determination step S32 is YES and step S33 is performed.

At step S33, the control target value of the engine speed set immediately prior to acceleration is set as the control target value. In other words, when the control target value of the engine speed set immediately prior to acceleration is higher than the control target value of the engine speed set by the kick down mode that is shifted to immediately after acceleration, and the throttle (accelerator) is not fully open, the control target value of the engine speed set immediately prior to acceleration is set as the control target value.

On the other hand, if NO is determined at determination steps S31 or S32, in both cases step S34 is performed. In other words, when the control target value of the engine speed set immediately prior to acceleration is not higher than the control target value of the engine speed set by the kick down mode that is shifted to immediately after acceleration, step S34 is performed. Moreover, when the control target value of the engine speed set immediately prior to acceleration is higher than the control target value of the engine speed set by the kick down mode that is shifted to immediately after acceleration, and the accelerator is fully open, step S34 is performed in a similar manner.

At determination step S34, the control target value of the engine speed set using the kick down mode shifted to immediately after acceleration is set as the control target value.

At step S25, the control target value is set based on the processing of determination steps S22, S33 and S34.

Next, FIG. 8 is used to explain a situation where second control 702 and third control 703 are used. For example, when accelerating after the throttle has been fully closed, there are cases when second control 702 sets the control target value of the engine speed as shown by arrow h1. In this case, the control target value of the engine speed set immediately prior to acceleration is higher than the control target value of the engine speed set by the kick down mode that is shifted to immediately after acceleration. As a result, third control 703 functions. When third control 703 functions, the control target value of the engine speed is maintained until the control target value of the engine speed set by the kick down mode that is shifted to immediately after acceleration becomes larger than the control target value of the engine speed set immediately prior to acceleration as shown by arrow i.

In this manner, if third control 703 is used, the control target value of CVT 100 is not set excessively far to the Low side immediately after acceleration even when second control 702 is being used. Accordingly, when accelerating, torque is output that better matches the rider's intentions, and smooth acceleration is achieved.

When control target value 303a of the engine speed set when the throttle is fully closed in third kick down mode 303 is at a position higher than control target value 301a of the engine speed set when the throttle is fully open in first kick down mode 301, the situation is slightly different.

For example, consider the state indicated by j on solid line 303a that indicates the control target value set when the throttle is fully closed by third kick down mode 303. In this situation, at the vehicle speed in the state indicated by j in FIG. 8, control target value 303a set when the throttle is fully closed by third kick down mode 303 is higher than control target value 301a of the engine speed set when the throttle is fully open by first kick down mode 301.

Next, consider the situation when, under control of third kick down mode 303, the accelerator is closed to decelerate, and then the accelerator is fully opened to accelerate in the state indicated by j in FIG. 8. If acceleration takes place in the state indicated by j in FIG. 8 after the accelerator has been closed to decelerate under control of third kick down mode 303, second control 702 performs control to shift to first kick down mode 301. Furthermore, in this embodiment, third control 703 is used. The accelerator has been fully opened to accelerate in the state indicated by j, and thus the control target value of the engine speed set immediately prior to acceleration is higher than the control target value of the engine speed set by the kick down mode shifted to immediately after acceleration, and the accelerator is fully open. Accordingly, step S34 is performed, and the control target value of the engine speed is set by first kick down mode 301 shifted to immediately after acceleration. As a result, the control of first kick down mode 301 is smoothly continued.

In third control 703, even if the control target value is set by kick down mode 300 set to the Top side immediately after acceleration by second control 702, the control target value of the engine speed does not fall. As a result, smooth acceleration is achieved immediately after acceleration.

An example of third control 703 has been described in which the control target value is set such that, when the control target value is set by kick down mode 300 set to the Top side immediately after acceleration by second control 702, the control target value of the engine speed does not fall. However, third control 703 may set the control target value such that the control target value of the speed change ratio does not vary to the Top side.

As a concrete example, when the control target value of the speed change ratio set by the kick down mode used when accelerating is further to the Top side than the control target value of the speed change ratio used immediately prior to acceleration, and the throttle is not fully open, when accelerating, the control target value of the speed change ratio used immediately prior to acceleration may be maintained until the control target value of the speed change ratio set by the kick down mode passes to the Low side of the control target value of the speed change ratio used immediately prior to acceleration.

In this case determination step S31 of FIG. 9 determines whether the control target value of the speed change ratio of CVT 100 set immediately prior to acceleration is to the Low side of the control target value of the speed change ratio of CVT 100 set by the kick down mode shifted to immediately after acceleration.

Based on the result, if it is determined that the control target value of the speed change ratio set immediately prior to acceleration is to the Low side of the control target value of the speed change ratio set by the kick down mode shifted to immediately after acceleration, YES is determined at determination step S31.

Determination step S32 determines whether the accelerator is fully open. When the control target value of the speed change ratio set immediately prior to acceleration is to the Low side of the control target value of the speed change ratio set by the kick down mode shifted to immediately after acceleration, and the accelerator is not fully open, YES is determined at determination step S32.

At step S33, the control target value set immediately prior to acceleration is set as the control target value. As a result, when the control target value of the speed change ratio set immediately prior to acceleration is to the Low side of the control target value of the speed change ratio set by the kick down mode shifted to immediately after acceleration, and the accelerator is not fully open, the control target value set immediately prior to acceleration is set as the control target value.

On the other hand, at step S34, the control target value set by the kick down mode shifted to immediately after acceleration is set as the control target value. As a result, when the control target value of the speed change ratio set immediately prior to acceleration is not to the Low side of the control target value of the speed change ratio set by the kick down mode shifted to immediately after acceleration, the control target value set by the kick down mode shifted to immediately after acceleration is set as the control target value.

Moreover, when the control target value of the speed change ratio set immediately prior to acceleration is to the Low side of the control target value of the speed change ratio set by the kick down mode shifted to immediately after acceleration, and the accelerator is fully open, in a similar manner, the control target value is set by the kick down mode shifted to immediately after acceleration.

In this manner, second control 702 and third control 703 can be used to perform control using the control target value of the speed change ratio as a reference.

A continuously variable transmission and straddle-type vehicle according to one embodiment of the invention have been described. However, the invention is not limited to the above-described embodiment.

For example, three levels of kick down mode have been described. However, when a plurality of levels of kick down mode is set, it is not essential for there to be three levels. In addition, first control 701 may be applied in a situation where a plurality of levels of kick down mode are not set.

Furthermore, in the above-described embodiment, the kick down mode is set based on multiplying the speed change characteristics of the normal mode by a constant ratio. However, a different technique may be used to set the kick down mode.

In addition, in the described example the control target value of the CVT is the engine speed and the speed change ratio of the CVT. However, the control target value of the CVT is not limited to this.

Moreover, sensors that can detect when the throttle is fully closed and fully open may be used for accelerator operation sensor 151, throttle opening degree sensor 152 etc. Thus, it is not essential that accelerator operation sensor 151, throttle opening degree sensor 152, etc. can determine the opening degree of the throttle.

Moreover, some straddle-type vehicles include two target value setting programs in the normal mode, namely, a drive mode and an assist mode, which are separate from the kick down mode. The drive mode is a mode that focuses on fuel consumption etc., and the assist mode is a so-called "sports mode" that sets the speed change ratio to the Low side as compared to the drive mode. With this configuration, there are occasions when a kick down mode is further set for each of the drive mode and the assist mode. Even in such a configuration, limit value 500 that is used when the throttle is fully closed may be set to inhibit slipping of primary sheave 102 and V-belt 105 of the CVT.

Also, a scooter motorcycle has been described as an example of a straddle-type vehicle. However, the invention is not limited to this type of straddle-type vehicle or even to a straddle-type vehicle. The CVT according to the invention can be mounted in, for example, an SSV (side-by-side vehicle) that has seating for two people, or the like.

The structure of the CVT is not limited to that described in the above embodiment. The invention may be applied to various types of CVTs that include a V-belt wound around a primary sheave and a secondary sheave, and in which the groove width of the primary sheave is adjusted by an actuator and a control device.

Figure 10:
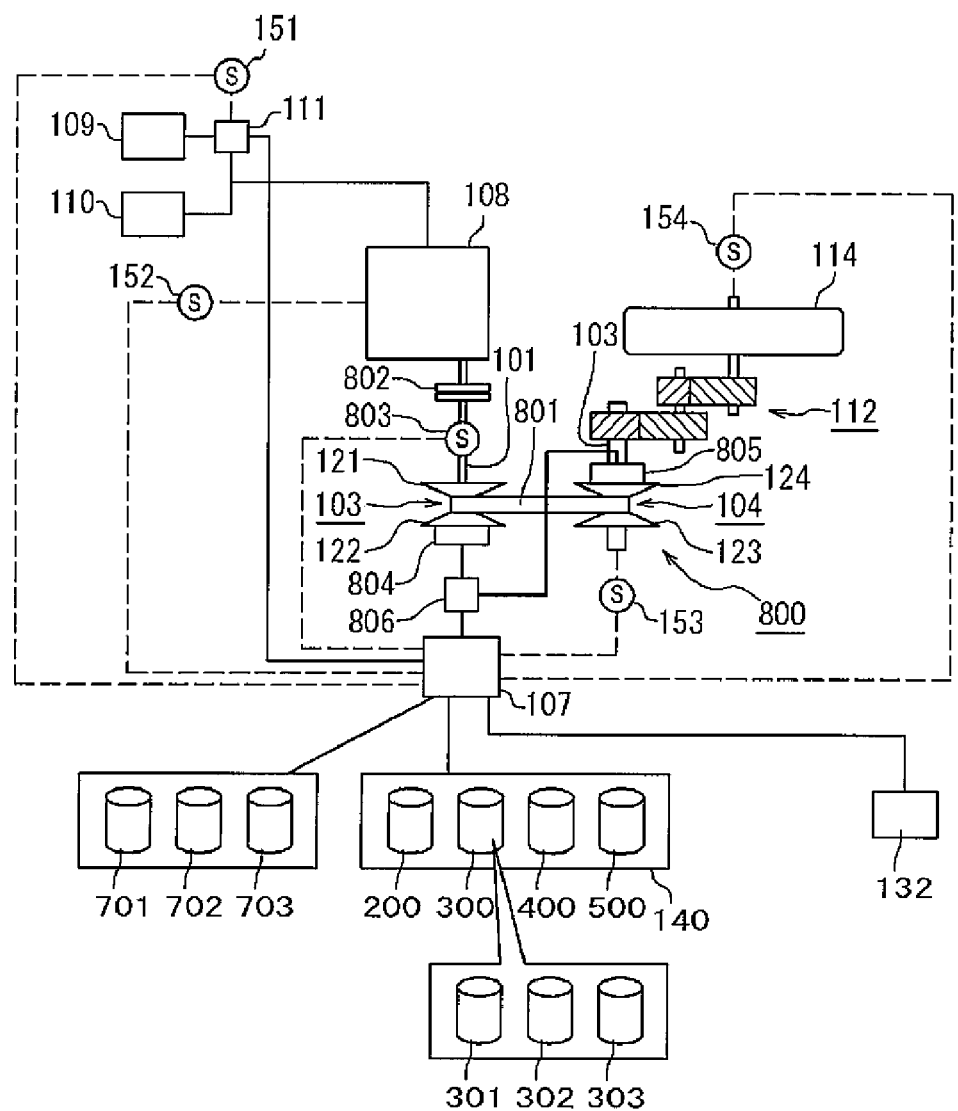
FIG. 10 shows a CVT according to another embodiment of the invention.

As the above-described CVT, for example, a CVT 800 including a metal belt as the V-belt may be used as shown in FIG. 10. In FIG. 10, structural members and sections that have the same operation as those in the CVT of FIG. 1 are denoted with the same reference numerals.

CVT 800 including a metal belt as the V-belt (hereinafter referred to as "metal belt CVT") is modified in various ways, in addition to including a metal V-belt 801. Metal belt CVT 800 includes a clutch 802, a primary rotation sensor 803, hydraulic cylinders 804, 805, and a hydraulic control valve 806.

Clutch 802 is disposed between an output shaft of engine 108, and an input shaft of metal belt CVT 800, and connects/disconnects transmission of power between the output shaft of engine 108 and the input shaft of metal belt CVT 800.

Primary rotation sensor 803 detects the rotation speed of primary sheave 103. In this embodiment, control device 107 computes the speed change ratio of the CVT 800 using the ratio of the rotation speed of primary sheave 103 detected by primary rotation sensor 803 and the vehicle speed of straddle-type vehicle 1000 detected by vehicle speed sensor 154. The speed change ratio of CVT 800 may be computed using the ratio of the rotation speed of primary sheave 103 detected by primary rotation sensor 803 and the rotation speed of secondary sheave 104 detected by secondary sheave rotation speed sensor 153.

Next, hydraulic cylinder 804 adjusts the groove width of primary sheave 103. Hydraulic cylinder 804 applies a pressing force to moveable flange 122 that forms part of primary sheave 103, thereby adjusting the groove width of primary sheave 103. Moreover, hydraulic cylinder 805 adjusts the groove width of secondary sheave 104. Hydraulic cylinder 805 applies a pressing force to moveable flange 124 that forms part of secondary sheave 104, thereby adjusting the groove width of secondary sheave 104. Hydraulic control valve 806 is controlled by control device 107 and adjusts the hydraulic pressure applied to hydraulic cylinders 804, 805. Hydraulic control valve 806 performs control such that, when the hydraulic pressure of one of the hydraulic cylinders 804 (805) is increased, the hydraulic pressure of the other hydraulic cylinder 805 (804) is reduced.

Metal belt CVT 800 is controlled by operation of hydraulic control valve 806 by control device 107 in accordance with the set control target value such that the speed change ratio of metal belt CVT 800 is changed. Control device 107 performs control of metal belt CVT 800 in a similar manner to the control of CVT 100. In metal belt CVT 800, control device 107 uses the control target value of the rotation speed of primary sheave 103 instead of the control target value of the engine speed.

As described above, a belt type CVT according to the invention can be used in a wide variety of applications as a belt type CVT of a straddle-type vehicle.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A continuously variable transmission having a speed change ratio that is controlled by a control device, comprising:
 a kick down operation member, wherein
 the control device is set with a normal mode that sets a control target value, a kick down mode that sets the control target value further to a Low side than the normal mode, and a limit value of the control target value used during re-acceleration, and in response to operation of the kick down operation member, the control target value is set by the kick down mode instead of the normal mode, and if acceleration is performed after a throttle is fully closed during control of the kick down mode, the control target value is set so as not to pass to the Low side of the limit value of the control target value used during re-acceleration.

2. The continuously variable transmission according to claim 1, wherein the control device is set with a plurality of levels of kick down modes that set the control target value progressively further to the Low side than the normal mode, and in response to operation of the kick down operation member, the control target value is set by one of the kick down modes among the plurality of levels of kick down modes instead of the normal mode, and if acceleration is performed after the throttle is fully closed during control of the given kick down mode, the control target value is set so as not to pass to the Low side of the limit value of the control target value used during re-acceleration.

3. The continuously variable transmission according to claim 2, wherein the control device performs control such that if acceleration is performed after the throttle is fully closed during control of the kick down mode, the control target value is set by the kick down mode that is set furthest to the Top side among the plurality of levels of kick down modes.

4. The continuously variable transmission according to claim 2, wherein the control device performs control such that if acceleration is performed after the throttle is fully closed during control of the kick down mode, the control target value is set by the kick down mode, among the plurality of levels of kick down modes, that is set further to the Top side than the kick down mode used immediately prior to accelerating after the throttle is fully closed.

5. The continuously variable transmission according to claim 1, wherein the control device determines whether acceleration is performed after the throttle is fully closed using a sensor that detects an operation amount of an accelerator operation member.

6. The continuously variable transmission according to claim 1, wherein the control device performs control such that if acceleration is performed after the throttle is fully closed during control of the kick down mode, and if the control target value set by the kick down mode is further to a Top side than the limit value of the control target value used during re-acceleration, the given control target value is set as the control target value, and if the control target value set by the kick down mode is further to the Low side than the limit value of the control target value used during re-acceleration, the limit value of the control target value used during re-acceleration is set as the control target value instead of the given control target value.

7. A continuously variable transmission having a speed change ratio that is controlled by a control device, comprising:

a kick down operation member, wherein the control device is set with a normal mode that sets a control target value, and kick down modes that set the control target value further to a Low side than the normal mode, and in response to operation of the kick down operation member, the control target value is set by the kick down modes instead of the normal mode, and if acceleration is performed after a throttle is fully closed during control of the kick down mode, the control target value is set by the kick down mode, among the plurality of levels of kick down modes, that is set furthest to the Top side.

8. A continuously variable transmission having a speed change ratio that is controlled by a control device, comprising:

a kick down operation member, wherein the control device is set with a normal mode that sets a control target value, and kick down modes that set the control target value further to a Low side than the normal mode, and in response to operation of the kick down operation member, the control target value is set by the kick down modes instead of the normal mode, and if acceleration is performed after a throttle is fully closed during control of the kick down mode, the control target value is set by the kick down mode, among the plurality of levels of kick down modes, that is set further to the Top side than the kick down mode used immediately prior to accelerating after the throttle is fully closed.

9. The continuously variable transmission according to claim 8, wherein the control device performs control such that the control target value is set such that an engine speed control target value does not temporarily fall immediately after acceleration if acceleration is performed after the throttle is fully closed during control of the kick down mode.

10. The continuously variable transmission according to claim 8, wherein the kick down mode sets the control target value based on an engine speed, and the control device performs control such that, if acceleration is performed after the throttle is fully closed during control of the kick down mode, when accelerating, if an engine speed control target value set by the kick down mode is small as compared to the engine speed control target value set immediately prior to acceleration and the throttle is not fully open, the engine speed control target value set immediately prior to acceleration continues to be used until the given engine speed control target value becomes higher than the engine speed control target value set immediately prior to acceleration.

11. The continuously variable transmission according to claim 8, wherein the control device performs control such that the control target value is set such that a speed change ratio control target value does not temporarily vary to the Top side immediately after acceleration if acceleration is performed after the throttle is fully closed during control of the kick down mode.

12. The continuously variable transmission according to claim 8, wherein the control device performs control such that if acceleration is performed after the throttle is fully closed during control of the kick down mode, and when the control target value set by the kick down mode used when accelerating is to the Top side of the control target value used immediately prior to acceleration, and the throttle is not fully open, the control target value used immediately prior to accelerating continues to be used until, when accelerating, the control target value set by the kick down mode passes to the Low side of the control target value used immediately prior to acceleration.

13. A straddle-type vehicle including an engine having an output controlled in accordance with operation of an accelerator operation member, a continuously variable transmission that is connected to the engine, and a control device that controls a speed change ratio of the continuously variable transmission, the straddle-type vehicle comprising:
- a kick down operation member that is provided separately from the accelerator operation member, wherein
- the control device is set with a normal mode that sets a control target value, a kick down mode that sets the control target value further to a Low side than the normal mode, and a limit value of the control target value used during re-acceleration, and
- the control device performs control such that
- in response to operation of the kick down operation member, the control target value is set by the kick down mode instead of the normal mode, and if acceleration is performed after a throttle is fully closed during control of the kick down mode, the control target value is set so as not to pass to the Low side of the limit value of the control target value used during re-acceleration.

14. The straddle-type vehicle according to claim 13, wherein
- the control device is set with a plurality of levels of kick down modes that set the control target value progressively further to the Low side than the normal mode, and
- the control device performs control such that, in response to operation of the kick down operation member, the control target value is set by one of the kick down modes among the plurality of levels of kick down modes instead of the normal mode, and if acceleration is performed after the throttle is fully closed during control of the given kick down mode, the control target value is set so as not to pass to the Low side of the limit value of the control target value used during re-acceleration.

15. The straddle-type vehicle according to claim 14, wherein the control device performs control such that, if acceleration is performed after the throttle is fully closed during control of the kick down mode, the control target value is set by the kick down mode that is set furthest to the Top side among the plurality of levels of kick down modes.

16. The straddle-type vehicle according to claim 14, the control device performs control such that, if acceleration is performed after the throttle is fully closed during control of the kick down mode, the control target value is set by the kick down mode, among the plurality of levels of kick down modes, that is set further to the Top side than the kick down mode used immediately prior to acceleration after the throttle is fully closed.

17. The straddle-type vehicle according to claim 13, wherein the control device determines whether acceleration is performed after the throttle is fully closed using a sensor that detects an operation amount of the accelerator operation member.

18. The straddle-type vehicle according to claim 13, wherein the control device performs control such that
- if acceleration is performed after the throttle is fully closed during control of the kick down mode, and
- if the control target value set by the kick down mode is further to a Top side than the limit value of the control target value used during re-acceleration, the given control target value is set as the control target value, and
- if the control target value set by the kick down mode is further to the Low side than the limit value of the control target value used during re-acceleration, the limit value of the control target value used during re-acceleration is set as the control target value instead of the given control target value.

19. A straddle-type vehicle including an engine having an output controlled in accordance with operation of an accelerator operation member, a continuously variable transmission that is connected to the engine, and a control device that controls a speed change ratio of the continuously variable transmission, the straddle-type vehicle comprising:
- a kick down operation member that is provided separately from the accelerator operation member, wherein
- the control device is set with a normal mode that sets a control target value, and kick down modes that set the control target value further to a Low side than the normal mode, and
- the control device performs control such that
- in response to operation of the kick down operation member, the control target value is set by the kick down modes instead of the normal mode, and
- if acceleration is performed after a throttle is fully closed during control of the kick down mode, the control target value is set by the kick down mode, among the plurality of levels of kick down modes, that is set furthest to the Top side.

20. A straddle-type vehicle including an engine having an output controlled in accordance with operation of an accelerator operation member, a continuously variable transmission that is connected to the engine, and a control device that controls a speed change ratio of the continuously variable transmission, the straddle-type vehicle comprising:
- a kick down operation member that is provided separately from the accelerator operation member, wherein
- the control device is set with a normal mode that sets a control target value, and kick down modes that set the control target value further to a Low side than the normal mode, and the control device performs control such that
- in response to operation of the kick down operation member, the control target value is set by the kick down mode instead of the normal mode, and
- if acceleration is performed after a throttle is fully closed during control of the kick down mode, the control target value is set by the kick down mode, among the plurality of levels of kick down modes, that is set further to the Top side than the kick down mode used immediately prior to acceleration after the throttle is fully closed.

21. The straddle-type vehicle according to claim 20, wherein the control device performs control such that the control target value is set such that an engine speed control target value does not temporarily fall immediately after acceleration if acceleration is performed after the throttle is fully closed during control of the kick down mode.

22. The straddle-type vehicle according to claim 20, wherein
- the kick down mode set in the control device sets the control target value based on an engine speed, and
- the control device performs control such that, if acceleration is performed after the throttle is fully closed during control of the kick down mode, when accelerating, if an engine speed control target value set by the kick down mode is small as compared to the engine speed control target value set immediately prior to acceleration and the throttle is not fully open, the engine speed control target value set immediately prior to acceleration continues to be used until the given engine speed control target value becomes higher than the engine speed control target value set immediately prior to acceleration.

23. The straddle-type vehicle according to claim 20, wherein the control device performs control such that the control target value is set such that a speed change ratio control target value does not temporarily vary to the Top side immediately after acceleration if acceleration is performed after the throttle is fully closed during control of the kick down mode.

24. The straddle-type vehicle according to claim 20, wherein the control device performs control such that if acceleration is performed after the throttle is fully closed during control of the kick down mode, and when the control target value set by the kick down mode used when accelerating is to the Top side of the control target value used immediately prior to acceleration, and the throttle is not fully open, the control target value used immediately prior to acceleration continues to be used until, when accelerating, the control target value set by the kick down mode passes to the Low side of the control target value used immediately prior to acceleration.

* * * * *